Feb. 10, 1953     R. C. MAGEE     2,628,135

ANTIFRICTION BEARING FOR LINEAR MOTION

Filed March 15, 1949     3 Sheets-Sheet 1

INVENTOR
Robert C. Magee
BY
Emery, Varney, Whittemore & Dix
ATTORNEYS

Feb. 10, 1953 — R. C. MAGEE — 2,628,135
ANTIFRICTION BEARING FOR LINEAR MOTION
Filed March 15, 1949 — 3 Sheets-Sheet 2

Feb. 10, 1953 R. C. MAGEE 2,628,135
ANTIFRICTION BEARING FOR LINEAR MOTION
Filed March 15, 1949 3 Sheets-Sheet 3

INVENTOR
Robert C. Magee
BY
Emery, Varney, Whittemore & Dix
ATTORNEYS

Patented Feb. 10, 1953

2,628,135

UNITED STATES PATENT OFFICE 2,628,135

ANTIFRICTION BEARING FOR LINEAR MOTION

Robert C. Magee, Manhasset, N. Y., assignor to John B. Thomson, Plandome, N. Y.

Application March 15, 1949, Serial No. 81,551

15 Claims. (Cl. 308—6)

This application is a continuation in part of my earlier application Serial Number 744,314, filed April 28, 1947.

The general purpose of this invention is to provide a bearing for anti-friction travel along a shaft in a linear direction for an unlimited distance, and a simple, practical and inexpensive method of manufacturing the same; for while the operative principle of the bearing is not new, most of the earlier structural designs embodying this principle have been too difficult and expensive to manufacture for commercial production. In the design here presented wherein a series of individual ball-circuits are spaced at regular intervals around the shaft, the entire structure consists essentially of a one-piece pressure-deformed outer sleeve, a one-piece press-formed inner sleeve, two end rings securing the outer and inner sleeves together, and the necessary balls to fill the circuits. A primary object of the invention has been so to design the bearing that substantially all of the forming operations can be done in a punch-press, thereby eliminating expensive machining and tedious hand-fitting work heretofore necessary.

Figure 1:
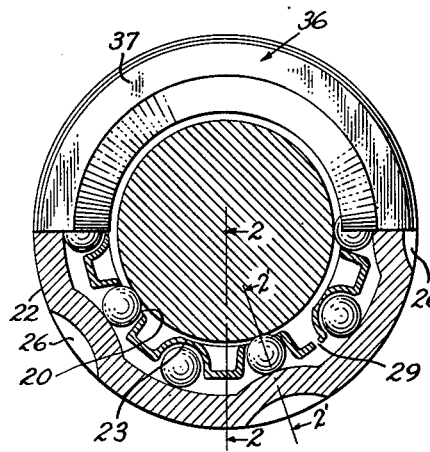
Figure 2:
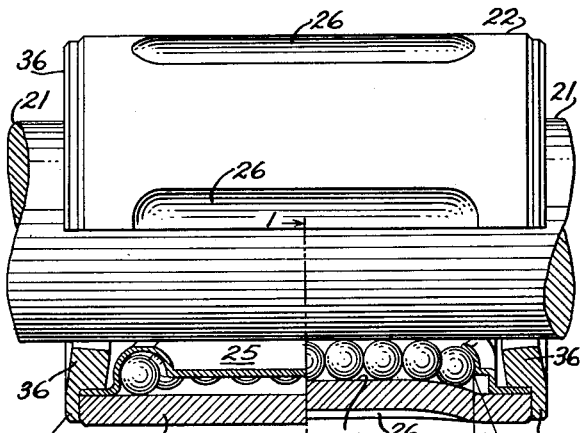
Figure 3:
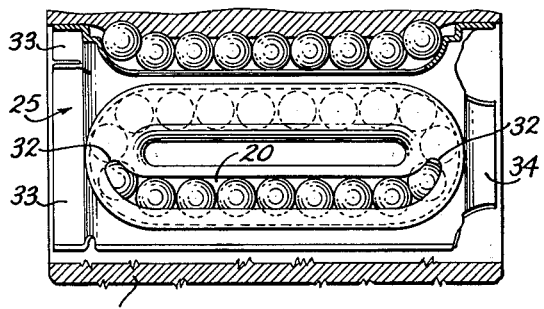
Figure 4:
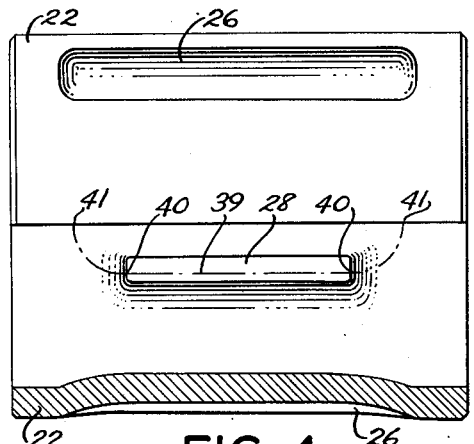
Figure 5:
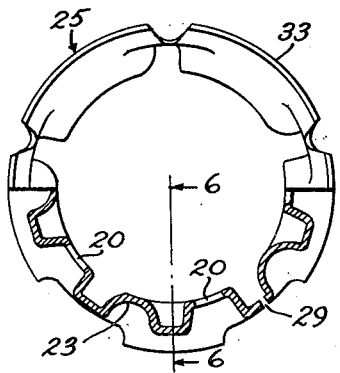
Figure 6:
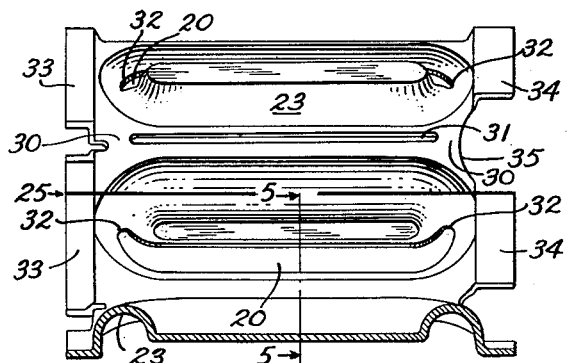
Figure 7:
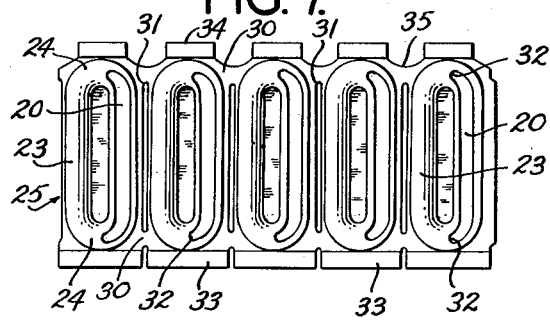
Figure 8:
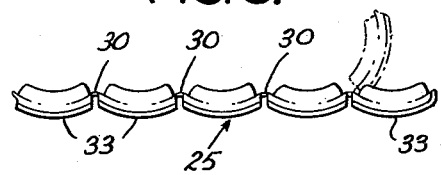
Figure 9:
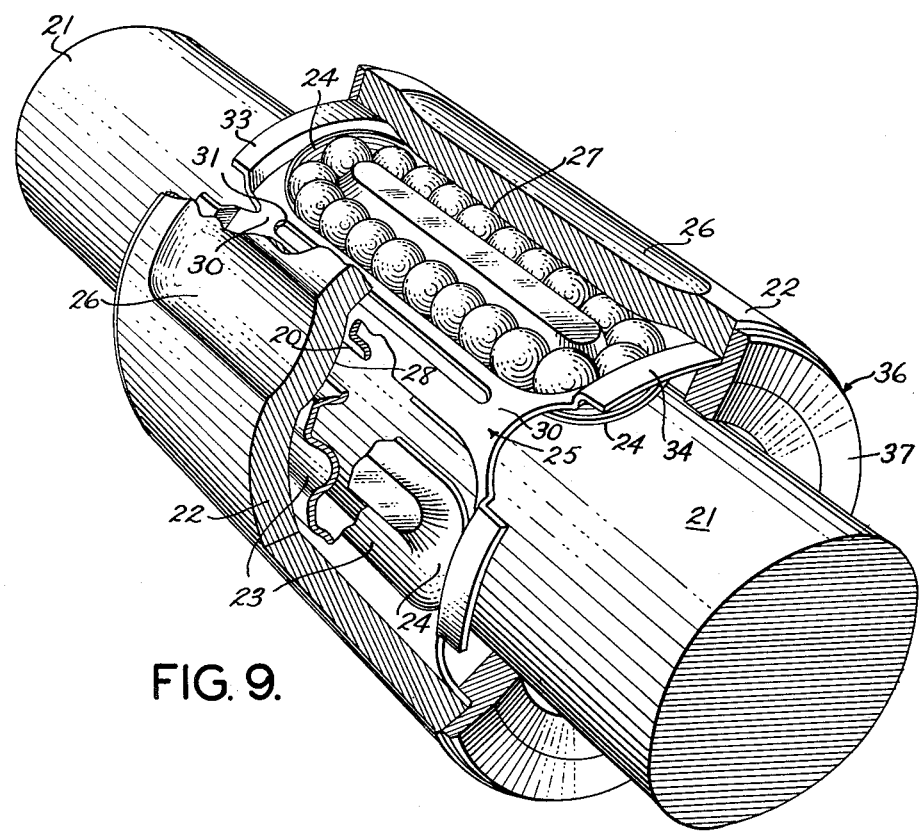
Figure 10:
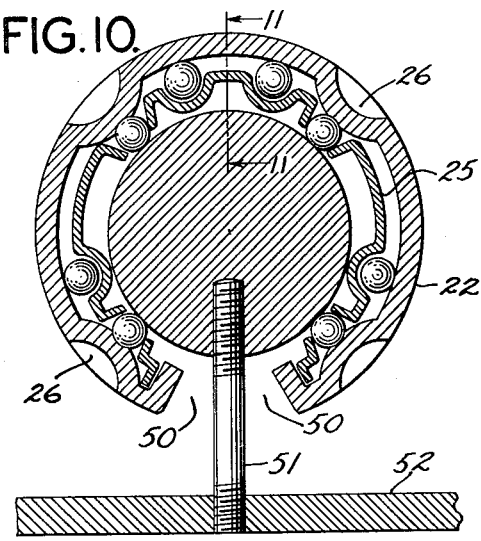
Figure 12:
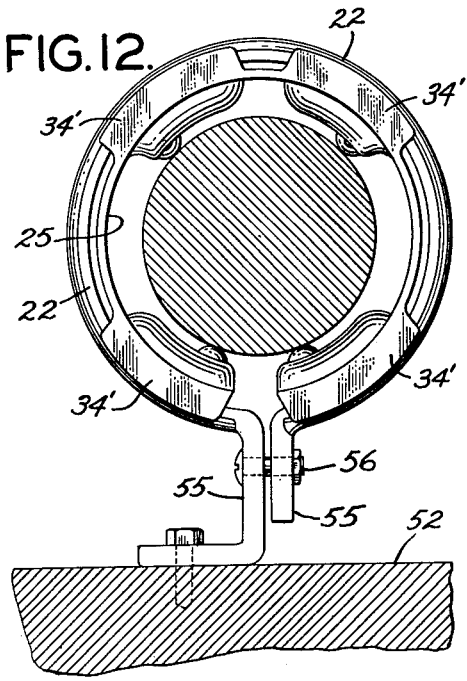
Figure 11:
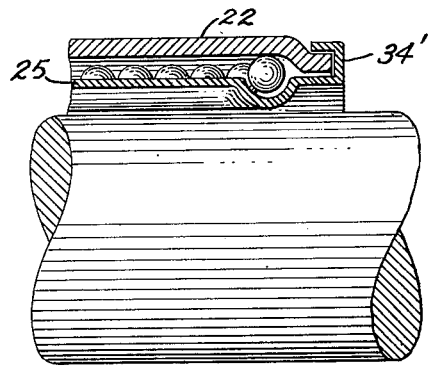
Figure 13:
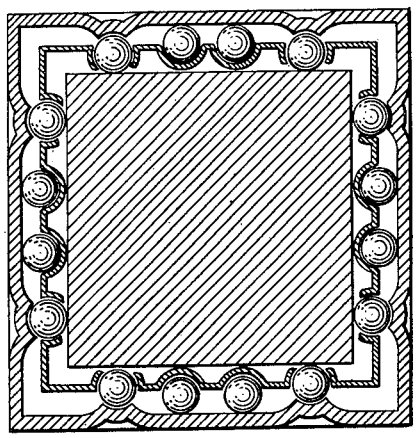

In the accompanying drawings, in which a bearing embodying my invention is illustrated, Fig. 1 is an end view of the same in position on a shaft, the lower half being in central transverse section and the upper half in elevation; Fig. 2 is a side view with the upper half in elevation and the lower half in section, the left hand part of the section being taken on the line 2—2 and the right hand part on the line 2'—2' in Fig. 1; Fig. 3 is a central longitudinal section shown without the shaft and with some parts broken away; Fig. 4 is a side view with the inner sleeve removed and the lower half shown in central longitudinal section; Figs. 5 and 6 are respectively end and side views of the inner sleeve, the lower half of Fig. 5 being shown in central transverse section and the lower half of Fig. 6 in a section taken on the line 6—6 in Fig. 5; Figs. 7 and 8 are respectively plan and end views, on a smaller scale, of the inner sleeve after being pressed from flat sheet material and before being bent into its final tubular shape; Fig. 9 is an enlarged perspective of the bearing mounted upon a shaft with parts broken away for clearer illustration; Fig. 10 is a view in central transverse section of another form of bearing embodying my invention; Fig. 11 is a portion of a longitudinal section taken on the line 11—11 in Fig. 10; Fig. 12 is an end view in elevation of still another form of bearing embodying my invention; and finally, Fig. 13 is a view in central transverse section of one more form of bearing embodying my invention.

In the type of bearing to which the present improvements relate, the individual ball circuits or raceways are generally oval-shaped, as here shown, and extend longitudinally of the bearing at evenly spaced intervals about the shaft. As shown perhaps most clearly in Fig. 9, each of these raceways (all of which are substantially filled with balls) has a straight portion 20 wherein the balls are in direct bearing contact with both the shaft 21 and the outer sleeve 22 and therefore carry the load, the straight portion 23 wherein the balls have no contact with the shaft and are free of the load, and the curved portions 24 which connect the ends of the straight portions to permit the balls to pass freely from one straight portion of the raceway to the other according to the direction in which the load-carrying balls are impelled by the relative movement of the bearing and shaft.

In each embodiment of my invention shown in the drawings, the inner sleeve 25 of the bearing wherein the raceways are formed, and which will later be described in detail, is disposed between the shaft and the balls. With this relative disposition of the inner sleeve it not only serves for the raceways but also as a retainer to hold the balls at all times between the outer and inner sleeves, whereby when the latter have been secured together, as hereinafter described, a structurally integral bearing unit is provided.

The outer sleeve 22, in the embodiment shown in Figs. 1 to 9, may be formed from straight steel tubing of uniform wall thickness having its external and interior surfaces concentric, to ensure which the tubing may be machined on its outer and inner surfaces. Before or after cutting it into pieces of the desired length or lengths for the bearings to be manufactured, the tubing is subjected to a pressure-deforming operation whereby each piece cut or to be cut from the tubing, is indented radially inward at equally spaced intervals around its periphery, as indicated by the concavely curved indentations 26. This operation may be readily effected by an ordinary punch-press or by a machine of special design and with the use of a tool suitably shaped to cause corresponding convexly curved raised portions 27 to be formed in the inner surface of each such piece, each said raised portion having a smooth contour and a constant inward depth for a considerable distance on either side of the central transverse plane of the piece and then gradually receding and blending into the original inner contour of the piece laterally as well as longitudinally and leaving a short length at each end unaffected by the tool. The tubing or, if it has already been cut into separate pieces, each piece thereof, is then hardened after which it is externally ground in a centerless type grinder, and then internally ground, as by a bore grinder disposed within it, to remove the inner extremities of the raised portions 27 and thereby form working tracks 28 for the balls. It is only on these tracks that the balls contact the outer sleeve 22 while carrying the load between that sleeve and the shaft. It is obvious, of course, that the outer sleeve could, if desired, be made from a flat strip in which the raised portions are first formed in a punch-press or in any other suitable manner and the strip then bent into tubular form. Indeed, if one desires, such a strip could first be bent end to end into tubular form and then indented or otherwise processed to form the raised portions on the inner surface.

The inner sleeve or retainer 25 I preferably produce from a single sheet of metal by the use of a punch-press and dies suitably formed to provide in the pressed sheet the protuberances, depressions and cut-out portions shown in Figs. 7 and 8; and then I bend the sheet end to end into tubular shape with the ends of said sheet abutting or forming a narrow open seam 29, Figs. 1 and 5. The forming operation on the sheet may be done by feeding a continuous strip of sheet material to the dies, or in any other suitable or known manner, for rapidly and automatically providing embossed sheets each of a length and width to conform respectively to the circumference and length of the retainer sleeves desired. After the forming or embossing operation and before being bent into tubular shape to constitute the retainer, each embossed sheet contains the same number of individual sections as there are tracks 28 in the outer sleeve (here, for example, five), and narrow tabs 30 connecting adjacent sections, which tabs may be formed by partially slitting or thinning the sheet along lines 31 whereby it will readily bend on those lines and thus may easily be rounded into tubular shape without deformation of the raceways; and each of said several sections is preferably concavo-convex in transverse-section, as shown in Fig. 8, so that when the sheet has been bent into tubular form along the lines 31, a transverse-section thereof will be substantially circular. Each of the individual sections of the embossed sheet has formed therein a complete raceway circuit of which the straight portion 20 is slotted, this slot being somewhat narrower than the diameter of the balls and terminating in tapered ends 32 which follow the curvature of the end portions 24 of the raceway through which the balls pass back and forth from the straight portion 20 to the straight portion 23. The ends 33 and 34 of each of the several sections of the embossed sheet are raised above the intermediate portions of the sections wherein the raceways are formed, so that when the sheet is bent into tubular shape, the diameter of its ends formed by the parts 33 and 34 will be greater than any part of its intermediate or raceway portion. And finally, the embossed sheet is scalloped along one of its edges to provide recesses 35 in one end of the retainer. Of course, if desired, the individual sections of the inner sleeve or retainer may be formed as separate pieces and each secured to the outer sleeve in the manner hereinafter described for securing the retainer as a whole to the outer sleeve, or in any other suitable manner.

In assembling the bearing, the inner sleeve is inserted into the outer sleeve with its scalloped end foremost so that that end, which, as well as its other end, should have an easy working fit with the internal surface of the outer sleeve, may, through the recesses 35, clear the inwardly projecting raised portions 27 of the outer sleeve upon which the working tracks 28 are formed. The balls may then be inserted into the several raceways of the bearing by holding the bearing in a substantially vertical position and slightly raising the inner sleeve to expose the upper ends of the raceways so that the balls can be introduced into those ends whereupon they will readily drop into place. The inner sleeve is then pushed back into the outer sleeve so that each end thereof will be flush with the ends of the outer sleeve and, while in that position, the inner sleeve is rotated within the outer sleeve to bring the slots 20 of the former respectively into registration with the working tracks 28 of the latter. It will assist somewhat in registering said slots and tracks if the recesses 35 of the inner sleeve are the same distance apart as the raised portions 27 of the outer sleeve. The outer and inner sleeves may then be firmly secured together by rings 36 inserted in each end of the inner sleeve so as to press the ends of that sleeve tightly against the ends of the outer sleeve; and said rings may have flanges 37 to abut against the ends of the outer sleeve.

Referring again to the raised portions 27 of the internal surface of the outer sleeve, an outstanding feature of the present invention is that the even surface contour of said raised portions, resulting as it does from the smoothness of the inner surface of the tubing before being indented as previously described, provides a very smooth and continuously even surface for the balls while travelling around their circuits, and this is achieved with a minimum of machining since the only machining necessary is that readily and easily applied to the interior of the tubing before the raised portions 27 thereof are formed. Moreover, since, as shown in Fig. 1, the radial position of the balls as they travel around their circuits varies from the extreme outward position of the free balls to the extreme inward position of the balls under load, and since in many applications to which this bearing may be put, the balls will be required to travel at very high velocities around their circuits, it is important in order to ensure against damaging impact or acceleration loads on the balls, that the transition of the balls from one extreme radial position to the other be accomplished as smoothly and gradually as possible. In Fig. 4 the dot and dash line 39 represents the approximate line of contact between the balls and the outer sleeve as determined by the ball circuit path. In following this path, the balls leave the working track 28 at the point 40 and gradually increase their radial distance from the center of the shaft to the point 41 where, as indicated by the shade lines of Fig. 4, the balls are then at their maximum outward radial distance. Obviously, it is desirable that the point 41 be as far as practicable from the working track 28 or transition point 40. Accordingly, the raised portions 27 are formed to have very gradual sloping and relatively flat shaped ends as shown by the shade lines in Fig. 4.

In some applications of my invention, it may be desirable to support the shaft externally of the bearing as, for example, where the load on the shaft is excessive or where the bearing traverses a shaft of considerable length; for in such cases an external support of the shaft may well be needed to give it rigidity. Thus, in a carpet-loom having a long bed which the reciprocating mechanism must traverse, the use of a shaft, say, ¾ inch in diameter and 15 or 20 feet in length, would require supports at intervals along its length to prevent sagging. In such a case as well as in the case of a relatively short shaft where extreme rigidity under load is desired, the embodiment (which I call "open type") of my invention illustrated in Figs. 10 and 11 will preferably be used. In this embodiment the raceways are constructed in the same manner and bear the same relation to the outer sleeve, as in the embodiment shown in Figs. 1 to 9, although the inner sleeve 25 has four instead of five oval-shaped raceways, and the flanges 34', instead of being held to the outer sleeve by end-rings, as 36 in Fig. 9, are bent around the ends of the outer sleeve. Its essential difference, as compared with the embodiment of Figs. 1 to 9, resides in the provision of a longitudinal opening 50 through both the inner and outer sleeves to the shaft 21, and which opening extends the entire length of the bearing. Through this opening shaft supporting means, such as posts 51, may extend at intervals along the shaft and be threaded into the latter and to a support 52. This permits the shaft to be externally supported against deflection without inhibiting relative movement between the shaft and the bearing.

In cases where the bearing of Figs. 1 to 9 is used on non-precision shafting, there is likely to be more or less play between the shaft and bearing. Since precision shafting is expensive and difficult to manufacture and since in many applications of my invention the elimination of play is important, I have provided the embodiment thereof shown in Fig. 12, which I call the "adjustable type" of my invention. In this embodiment the inner sleeve 25, an end view of which is shown in Fig. 12, may have the same form and be secured to the outer sleeve 22 in the same way as in the embodiment of Figs. 5, 10 and 11, and both the inner and outer sleeves are split longitudinally as in Figs. 10 and 11. The characteristic feature of the Fig. 12 embodiment is that the edges of the outer sleeve along the split have oppositely facing flanges 55 which may be drawn toward each other and held in any desired adjusted position relative to each other, by an adjusting bolt 56. In this way, the diameter of the outer sleeve may be varied to prevent play between it and the shaft. Moreover, one of the flanges of the outer sleeve may be extended and bent, as shown, to form a support for the bearing, whereby in effect the bearing becomes a complete unit for mounting upon a supporting base, thus making it unnecessary to provide the customary additional casting or housing for mounting the bearing in the desired position.

It will be obvious that a bearing of my invention may be constructed for travel on shafts of various cross-sectional shapes, that shown in Fig. 13, for example, being applicable to shafts rectangular in cross-section.

I claim as my invention:

1. An anti-friction bearing for combination with a shaft to provide for relative linear movement between the bearing and shaft and having a plurality of longitudinally extending oval-shaped raceways, balls substantially filling said raceways and each of which is sometimes under load and sometimes a free ball, a sleeve, and a retainer within the sleeve in which said raceways are formed and which is slotted to permit the balls under load to have direct bearing contact with both the sleeve and the shaft, and characterized by this: that the external surface of the sleeve has indentations at spaced intervals about its periphery and corresponding raised portions on its internal surface, said raised portions constituting working tracks for the balls under load and registering respectively with the slots in the retainer.

2. The bearing defined in claim 1 further characterized by this: that the said working tracks are formed on the respective inner extremities of the raised portions of the inner surface of the sleeve, and that the ends of said raised portions recede gradually from said tracks to and blend into the original contour of the interior surface of the sleeve.

3. An anti-friction bearing for combination with a shaft to provide for relative linear movement between the bearing and shaft and having a plurality of longitudinally extending oval-shaped raceways, balls substantially filling said raceways and each of which is sometimes under load and sometimes a free ball, a sleeve having longitudinal convexly curved raised portions in and spaced around its inner surface, and a retainer within said sleeve in which said raceways are formed and which has slots registering respectively with the aforesaid raised portions of said sleeve to permit the balls under load to have direct bearing contact with both the shaft and the said raised portions, and characterized by this: that the retainer consists of a single metallic sheet of tubular shape having several individual sections in each of which one of the aforesaid raceways is formed complete.

4. The bearing defined in claim 3 further characterized by this: that adjacent sections of the retainer are connected by tabs to provide an integral retainer of tubular shape.

5. The bearing defined in claim 3 further characterized by this: that rings are provided at the ends of said sleeve, and that the ends of the retainer are held between and tightly held by said rings and the ends of said sleeve, whereby the retainer and said sleeve are maintained in their proper relative positions to constitute a structurally integral unit.

6. An outer sleeve of a ball bearing for linear motion in combination with an inner sleeve having raceways for the balls each of which is sometimes under load and sometimes a free ball, said outer sleeve having convexly curved raised portions on its inner surface, and the inner extremities of the raised portions providing working tracks for the balls under load.

7. A ball-bearing for combination with a shaft to provide for relative linear movement between the bearing and shaft and comprising an outer sleeve having at spaced intervals about its periphery raised portions on its internal surface providing along their inner extremities working tracks for the balls under load, an inner sleeve in which a plurality of longitudinally extending oval-shaped raceways are formed each of which has a cut-out portion to provide a slot and these slots registering respectively with said working tracks of the outer sleeve, balls substantially filling said raceways, and rings extending into and pressing radially against the ends of the inner sleeve whereby the latter is held in a vise-like grip by the rings and the ends of the outer sleeve.

8. The ball-bearing defined in claim 7 further characterized by this: that the inner sleeve consists of a relatively thin integral sheet bent into tubular shape with its ends fitted to and clamped to the ends of the outer sleeve and having its intermediate portion embossed to form the raceways.

9. The ball-bearing defined in claim 7 further characterized by this: that the ends of the inner sleeve have a working fit with the outer sleeve and that at least one of the ends of the inner sleeve is provided with recesses whereby in assembling the inner and outer sleeves the inner sleeve may clear the raised portions of the outer sleeve.

10. In a ball bearing for linear motion on a shaft and in which each ball is sometimes under load and sometimes a free ball, the combination of an outer sleeve having on its inner surface convexly curved raised portions to provide working tracks for the balls under load, and an inner sleeve secured in fixed relation to the outer sleeve and in which ball raceways are formed, the portions of the inner sleeve which face the raised portions of the outer sleeve having slots whereby the balls in register with said slots will have bearing contact with both the shaft and the outer sleeve.

11. The bearing defined in claim 10 and which is further characterized by having a longitudinal opening through both said sleeves to the shaft whereby the shaft may be externally supported without inhibiting relative movement between the shaft and the bearing.

12. An anti-friction bearing for combination with a shaft to provide for relative linear movement between the bearing and shaft and having a plurality of longitudinally extending oval-shaped raceways, balls substantially filling said raceways, the balls in one of the straight portions of the raceways being in bearing contact with the shaft while the balls in the other straight portion and the connecting curved portions are in clearance, and characterized by this: that the bearing is split longitudinally and that means are provided to adjust its bore diameter by varying the distance between the oppositely facing edges produced by the split.

13. In a ball bearing for linear motion on a shaft and in which each ball is sometimes under load and sometimes a free ball, the combination of an outer sleeve having on its inner surface convexly curved raised portions to provide working tracks for the balls under load, an inner sleeve secured in fixed relation to the outer sleeve and in which ball-raceways are formed, the portions of the inner sleeve which face the raised portions of the outer sleeve having slots whereby the balls in register with said slots will have bearing contact with both the shaft and the outer sleeve, both sleeves being split longitudinally and the outer sleeve provided with oppositely facing flanges along the edges formed by the split, and means to adjust the relative positions of the flanges to vary the diameter of the outer sleeve.

14. In a ball bearing for linear motion on a shaft and in which each ball is sometimes under load and sometimes a free ball, the combination of an outer sleeve having on its inner surface convexly curved raised portions to provide working tracks for the balls under load, an inner ball retainer secured in fixed relation to the outer sleeve and in which ball raceways are formed, the portions of the inner ball retainer which face the raised portions of the outer sleeve having slots whereby the balls in register with said slots will have bearing contact with both the shaft and the outer sleeve, the outer sleeve being split longitudinally and provided with oppositely facing flanges along the edges formed by the split, and means to adjust the relative positions of the flanges to vary the diameter of the outer sleeve.

15. An anti-friction bearing for combination with a shaft to provide for relative linear movement between the bearing and shaft and having a plurality of longitudinally extending oval-shaped raceways, balls substantially filling said raceways, the balls in one of the straight portions of the raceways being in bearing contact with the shaft while the balls in the other straight portion and the connecting curved portions are in clearance, and characterized by this: that the bearing has a longitudinal opening extending from one end to the other whereby the shaft may be supported along its length without inhibiting relative movement between the shaft and the bearing.

ROBERT C. MAGEE.

REFERENCES CITED

The following references are of record in the file of this patent:

UNITED STATES PATENTS

| Number | Name | Date |
|---|---|---|
| 669,033 | Hayes | Feb. 26, 1901 |
| 2,452,117 | Ferger | Oct. 26, 1948 |
| 2,509,749 | Thomson | May 30, 1950 |

FOREIGN PATENTS

| Number | Country | Date |
|---|---|---|
| 755,957 | France | 1933 |

OTHER REFERENCES

Automotive Industries, August 15, 1945.